(12) United States Patent
Satyanarayanan

(10) Patent No.: US 8,954,923 B2
(45) Date of Patent: Feb. 10, 2015

(54) MECHANISM FOR FACILITATING DYNAMIC INTERACTION WITH DEVELOPMENT APPLICATIONS AND TOOLS AN ON-DEMAND SERVICES ENVIROMENT

(71) Applicant: salesforce.com, inc., San Francisco, CA (US)

(72) Inventor: Rajaram Satyanarayanan, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 138 days.

(21) Appl. No.: 13/841,277

(22) Filed: Mar. 15, 2013

(65) Prior Publication Data
US 2013/0318492 A1 Nov. 28, 2013

Related U.S. Application Data

(60) Provisional application No. 61/650,007, filed on May 22, 2012.

(51) Int. Cl.
G06F 9/44 (2006.01)
G06F 9/445 (2006.01)

(52) U.S. Cl.
CPC .. *G06F 8/70* (2013.01); *G06F 8/34* (2013.01); *G06F 9/4451* (2013.01); *G06F 8/20* (2013.01)
USPC ........................................................ 717/104

(58) Field of Classification Search
CPC .................................. G06F 8/38; G06F 3/048
USPC ........................................................ 717/104
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |

(Continued)

*Primary Examiner* — Philip Wang
(74) *Attorney, Agent, or Firm* — Blakely Sokoloff Taylor & Zafman LLP

(57) ABSTRACT

In accordance with embodiments, there are provided mechanisms and methods for facilitating dynamic interaction with development applications and tools in an on-demand services environment in a multi-tenant environment according to one embodiment. In one embodiment and by way of example, a method includes receiving, from log files, historical user preferences and usage data relating to a user and one or more development tools for software development at a computing device. The historical user preferences and usage data may be based on past acts of the user and recorded at the log files. The method may further include generating a model based on the historical user preference and usage data, determining one or more predictions from the model. The predictions may include one or more of: an ordering of the development tools, a filtering of a plurality of features of one or more of the development tools, and a usage-based customization of the one or more development tools. The method may further include providing the development tools for display to the user based on the predictions.

17 Claims, 13 Drawing Sheets

(56) References Cited

U.S. PATENT DOCUMENTS

| | | |
|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 * | 2/2005 | Warner et al. ............ 1/1 |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 * | 12/2003 | Warner et al. ............ 707/1 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2013/0080362 A1 * | 3/2013 | Chang et al. ............ 706/21 |
| 2013/0297716 A1 * | 11/2013 | Spittle et al. ............ 709/212 |

\* cited by examiner

MECHANISM FOR FACILITATING DYNAMIC INTERACTION WITH DEVELOPMENT APPLICATIONS AND TOOLS AN ON-DEMAND SERVICES ENVIROMENT

CLAIM OF PRIORITY

This application claims the benefit of U.S. Provisional Patent Application No. 61/650,007, entitled "System and Method for Optimizing Application Interaction" by Rajaram Satyanarayanan, et al., filed May 22, 2012, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic interaction with development applications and tools in an on-demand services environment.

BACKGROUND

With increasing development applications and tools, there remains a need for better interaction between the user and the development applications and tools. For example, using conventional systems, users (e.g., software/application developers) have to go through a cumbersome process of sorting through various development applications/tools to perform their tasks which is time-consuming, resource-consuming, and error-prone.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
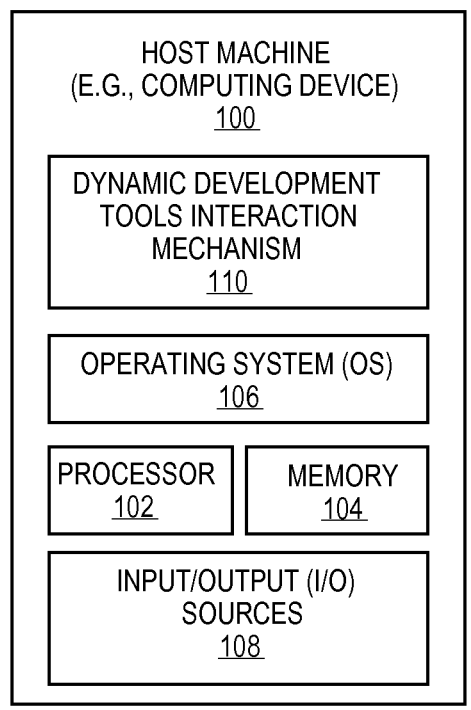
FIG. 1 illustrates a computing device employing dynamic development tools interaction mechanism according to one embodiment.

In accordance with embodiments, there are provided mechanisms and methods for facilitating dynamic interaction with development applications and tools in an on-demand services environment in a multi-tenant environment according to one embodiment. In one embodiment and by way of example, a method includes receiving, from log files, historical user preferences and usage data relating to a user and one or more development tools for software development at a computing device. The historical user preferences and usage data may be based on past acts of the user and recorded at the log files. The method may further include generating a model based on the historical user preference and usage data, determining one or more predictions from the model. The predictions may include one or more of: an ordering of the development tools, a filtering of a plurality of features of one or more of the development tools, and a usage-based customization of the one or more development tools. The method may further include providing the development tools for display to the user based on the predictions.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic interaction with development applications and tools in an on-demand services environment in a multi-tenant environment according to one embodiment. In one embodiment and by way of example, a method includes receiving, from log files, historical user preferences and usage data relating to a user and one or more development tools for software development at a computing device. The historical user preferences and usage data may be based on past acts of the user and recorded at the log files. The method may further include generating a model based on the historical user preference and usage data, determining one or more predictions from the model. The predictions may include one or more of: an ordering of the development tools, a filtering of a plurality of features of one or more of the development tools, and a usage-based customization of the one or more development tools. The method may further include providing the development tools for display to the user based on the predictions.

Embodiments provide for optimization of interactions with any number and type of development applications and tools (collectively referred to as "tools"). In one embodiment, an interaction model may be prepared and applied so that the user (e.g., software/application developers, system administrators, database administrators, information technology ("IT") professionals, etc.) may be offered and presented with an efficient interaction with development tools, where efficient interaction may include tools offered, for example, in a preferred order as well as filtered and based on usage customization. For example, in one embodiment, a model technique, such as the Hidden Markov Model ("HMM") technique that is used for temporal pattern recognition and prediction, such as with regard to speech, gesture recognition, bioinformatics, etc., may be generated based on, for example, usage history and task objectives of users and the applied to achieve dynamic interaction with tools, where this dynamic interaction may be provided through an application programming interface ("API") that supports one or more of a configurable, dynamic tool using toolbar, menu bar, embedded dynamic Hyper-Text Markup Language ("HTML") or other programming codes, etc.

For example, a typical software development cycle may begin with a set of requirements to be prioritized and sized for capacity planning and estimation. Depending on the user's role, the user may interact with any and type of development tools from any number and type of sources to perform any number and type of tasks. For example, these development tools may include, but are not limited to, Sprint® management tools (if the development organization uses the Agile® development methodology), Microsoft® ("MS") project tools (for capacity planning and resource allocation), any number and type of bug tracking tools for tracing and tracking software bugs, social network-based tools (such as Chatter® by Salesforce.com®), and the like. These and other examples may be referenced throughout the document for brevity, clarify, and ease of understanding. Referring back to user interactions with these development tools, they may depend on one or more of the software development cycle, the importance of the development project, the impact of the software development project and/or produce, priority in relation to other projects, etc.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating a mechanism for facilitating dynamic interaction with development applications and tools in an on-demand services environment in a multi-tenant environment will be described with reference to example embodiments.

FIG. 1 illustrates a computing device 100 employing dynamic development tools interaction mechanism 110 according to one embodiment. In one embodiment, computing device 100 serves as a host machine employing dynamic development tools interaction mechanism ("tool interaction mechanism") 110 for facilitating optimization of and dynamic interaction with any number and types of development applications and tools at any number and type of software platforms and architectures in a multi-tiered, multi-tenant, on-demand services environment. As aforementioned, the term "user" may refer to a system user, such as, but not limited to, a software/application developer, a system administrator, a database administrator, an information technology professional, a program manager, product manager, etc., or an end-user, such as a representative of a customer (e.g., an organization, a business, a company, a corporation, a non-profit entity, an institution, an agency, etc.). The customer may be a customer or client of the provider (e.g., Salesforce.com) of tool interaction mechanism 110. It is to be noted that terms like "user", "customer", "organization", "tenant", "business", "company", etc., may be used interchangeably throughout this document.

It is to be noted that software development applications and tools discussed in this document are merely used as examples for brevity, clarity, ease of understanding, and not to obscure tool interaction mechanism 110; however it is contemplated that embodiments are not limited to development applications and tools and that they are workable with and applicable to any number and type of other applications and processes, such as customer relationship management (CRM)-based processes and applications (e.g., sales, accounting, customer support, marketing, technical support, etc.), in different phases of business processes, etc. Similarly, the HMM is used as an example and that embodiments are not limited to the HMM or any particular model and that any number and type or form of other models may be employed and used and be applicable with various processes and applications (e.g., CRM applications/processes). Nevertheless, the HMM-based approach discussed throughout this document is not limited to development applications and tools and that it is equally applicable to and workable with any number and type of processes and applications, such as the aforementioned CRM business processes, and any number type of other customer-specific hosted applications and processes, such as those provided by on-demand software platforms (e.g., software as a service (SaaS) platform by Salesforce.com), etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "input", "request" and "message" may be used interchangeably throughout this document.

Figure 2:
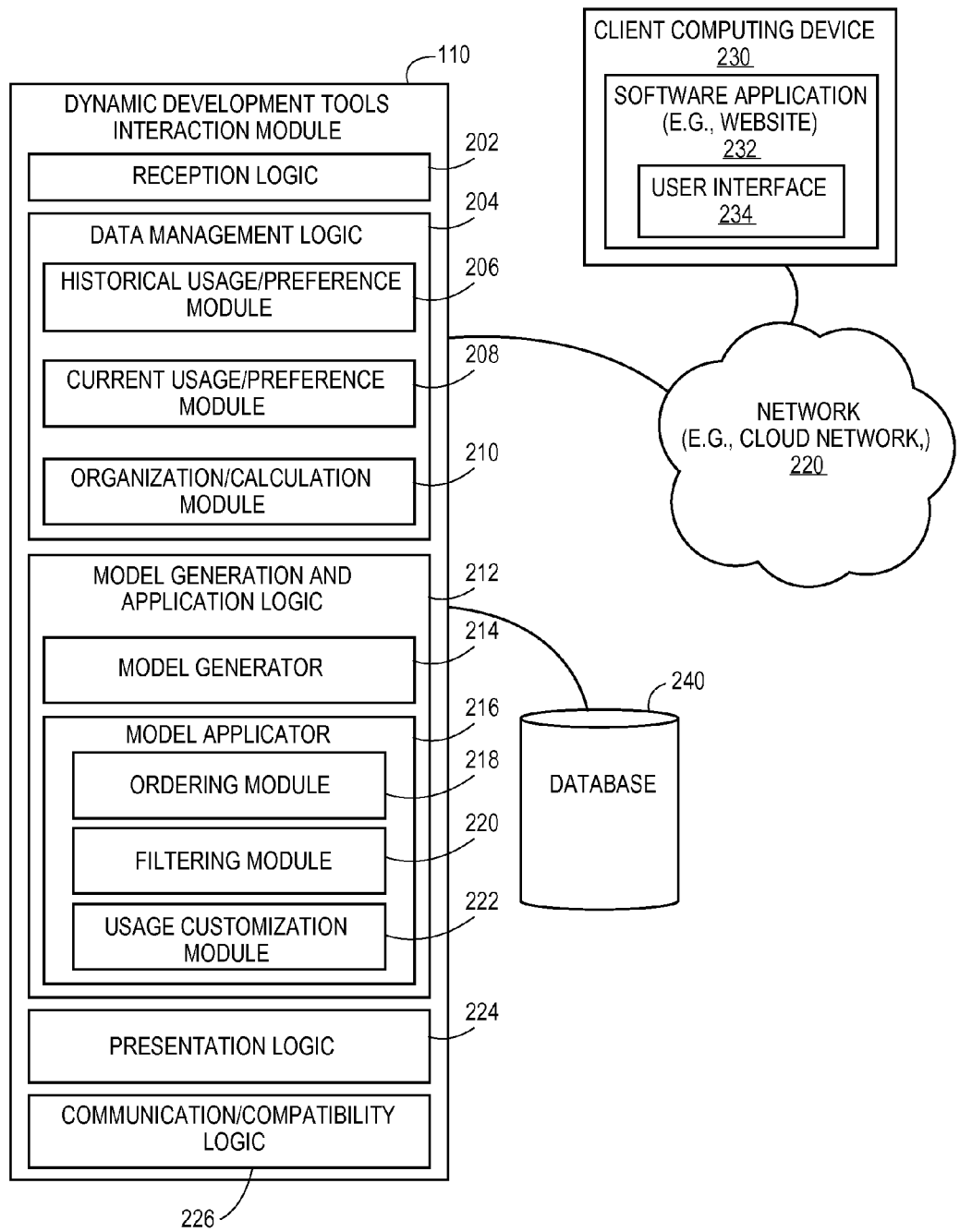
FIG. 2 illustrates dynamic development tools interaction mechanism according to one embodiment.

FIG. 2 illustrates dynamic development tools interaction mechanism 110 according to one embodiment. In one embodiment, tool interaction mechanism 110 includes a number of components, such as reception logic 202, data management logic 204 including historical usage/preference module 206, current usage/preference module 208, and organization/calculation module 210, model generation and application logic 212 including module generator 214 and module applicator (also referred to as "inference engine") 216 including ordering module 218, filtering module 220 and usage customization module 222, presentation logic (also referred to as application palette user interface ("UI") engine) 224, and communication/compatibility logic 226. Throughout this document, "logic" may be interchangeably referred to as "component" or "module" and may include, by way of example, software, hardware, and/or any combination of software and hardware, such as firmware.

As aforementioned, a typical software development process begins with a software development cycle that includes a requirement phase and an implementation phase. The requirement phase, for example, may include various sub-processes associate with a model (e.g., the HMM model), the sub-processes may include requirement gathering, capacity planning, and resource allocation for various development tools (e.g., Sprint Planner®, MS Project®, Chatter Group, etc.). Similarly, the implementation phase may include a number of sub-processes including development, implementation, etc. In one embodiment, using tool interaction mechanism 110, these phases and their processes are enhanced optimized to provide maximum dynamic interaction between the user and various development tools as is further below and illustrated with respect to FIGS. 3A and 3B.

In one embodiment, reception logic 202 may have access to the various internal and external log sources (e.g., log files) that are tapped to retrieve or receive any amount and type of information regarding the user and the user's preferences, usage activities, etc., that are continuously or periodically recorded in log files, such as Salesforce.com internal application logs, application usage logs from external systems, etc. In one embodiment, once the relevant data is received at reception logic 202, it is then forwarded on to data management logic 204 where the data is tracked and managed to prepare it for facilitating dynamic interaction with development tools using tools interaction mechanism 110. Any amount and type of data discussed here with reference to tools interaction mechanism 110 may be stored at and accessed from database 240.

For example and in one embodiment, upon receiving raw data from reception logic 202, historical usage/preference module 206 may select or track the relevant data from the raw data, where the relevant data may include various user activities relating to user/organization preferences and usages, such as the product manager in the organization uses MS Project, but neither the product owner nor the developer uses the this development tools. Similarly, various usage activities, such as whether a tool is used for "read" and/or "write", the frequency at which a tool or its features are accessed or used, etc. Historical usage/preference module 206 keeps track of and manages the user's historical preferences and usage activities, whereas, in one embodiment, current usage/preference module 208 automatically, directly and/or using reception module 202, tracks and manages such preferences and usages in real-time or runtime, where such activities may include changing from a long-standing user "read" activity to "write" activity relating to a tool or a tool feature, accessing a tool or a tool feature which has not been accessed for a certain period of time, or the like.

In one embodiment, organization/calculation module 210 uses the information obtained by historical and current usage/preference modules 206, 208 to calculate various probabilities (e.g., what is probability that the developer is going to use MS Project today based on the product manager's current activities or those from yesterday or last week or in what order or sequence is the product manager going to use the available development tools, etc.) and/or organizes the available information so that is may be manipulated and applied by model generation and application logic 212 to provide the necessary interaction between various users and development tools.

In one embodiment, model generator 212 receives the relevant data from data management logic 204 and based on the received data, model generator 212 generates a model (e.g., HMM model) that can then be used to facilitate optimization of the user's interaction with development tools. For example, in case the HMM model is used, various probabilities and scenarios (such as those obtained from organization/calculation module 210) may be taken into consideration and put into various formulae to generate a model that can be applied, via model applicator 216, to extract maximum optimization in interaction, such as in terms of ordering, filtering, usage customization, etc. Once the model is properly generated, it is forwarded on to model applicator 216 to apply or execute the model.

For example and in one embodiment, ordering module 218 facilitates ordering of development tools for users, such that a user is offered a proper ordering of development tools in the order the user is likely to use the development tools. For example, in keep track of the user's access and usage activities, a probability is calculated according to which the user is likely to access the available developing tools, such as the developer at an organization is likely to access the four available tools or set of tools in the following order: Microsoft tools, Agile or Sprint tools, Chatter tools, and bug tracking tools. It is contemplated the order may be in the form of icons or list, etc., on the user's screen at client computing device 230. For example, an icon may be associated with each development tool and displayed on the display screen of client computing device 230 or accessed through user interface 234 (e.g., website, development tools interface, etc.) of a software application (e.g., website, development tools software application, etc.) that may be running at client computing device 230 or accessed via network 220 (e.g. cloud network).

Similarly, using the probabilities and various other calculates as set forth in the model generated by model generator 214, filtering module 220 may filter various tools so that, for example, the user's display screen is not unnecessarily cluttered with those development tools that, based on the model, are not likely to be accessed or used by the user. Continuing with the example above, it may be determined using the model that the developer is only likely to access and/or use two of the four available development tools or set of tools, such as Sprint tools and Chatter tools, in which case the other two tools or set of tools are filtered out by filtering module 220 using the applicable model.

In one embodiment, usage customization module 222 may use the information, like various probabilities, to customize the available tools that are offered to the user. For example, once ordered by ordering module 218 and filtered by filtering module 220, usage customization module 222 reviews the model for information relating to the user's historical and real-time accesses, uses, and other activities of relating to various development tools and their features to customize the development tools that offered to the user based on ordering and filtering. This customization technique offers the user an even greater dynamic and enhanced interaction with the development tools. For example, if a product manager at an organization is not likely to use the Sprint management tools for writing or modification, then the Sprint tools may be customized for read-only activities for the product manager, which, using this example, may allow usage customization module 222 to remove certain write-related features, such as certain forms, form entries, dialogues, etc. Further, using current usage/preference module 208, ordering, filtering, and usage customization of developing tools may be performed in real-time.

After the model (e.g., HMM) has been applied by model applicator 216, in one embodiment, presentation logic 224 presents the results for visualization. In other words, once the ordering, filtering and/or usage customization of development tools is determined, presentation logic 224, via communication/compatibility logic 226, presents the information to client computing device 230 where the icons and/or text phrases representing various development tools are visualized for or displayed to the user based on the calculated order, filter, and usage customization. In one embodiment, presentation logic 224 may be implemented as an API. In another embodiment, presentation logic 224 may be implemented as a user interface.

Communication/compatibility logic 216 may facilitate the ability to dynamically communicate and stay configured with any number and type of software/application developing tools, models (e.g., the HMM model, etc.), data processing servers, database platforms and architectures, programming languages and their corresponding platforms, etc. Communication/compatibility logic 216 further facilitates the ability to dynamically communicate and stay configured with various computing devices (e.g., mobile computing devices (such as various types of smartphones, tablet computers, laptop, etc.), networks (e.g., Internet, intranet, cloud-computing network, etc.), websites (e.g., social networking websites, such as Facebook®, LinkedIn®, Google+®, etc.), and the like, while ensuring compatibility with changing technologies, parameters, protocols, standards, etc.

It is contemplated that any number and type of components may be added to and/or removed from tools interaction mechanism 110 to facilitate various embodiments including adding, removing, and/or enhancing certain features. For brevity, clarity, ease of understanding, and not to obscure tools interaction mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3A:
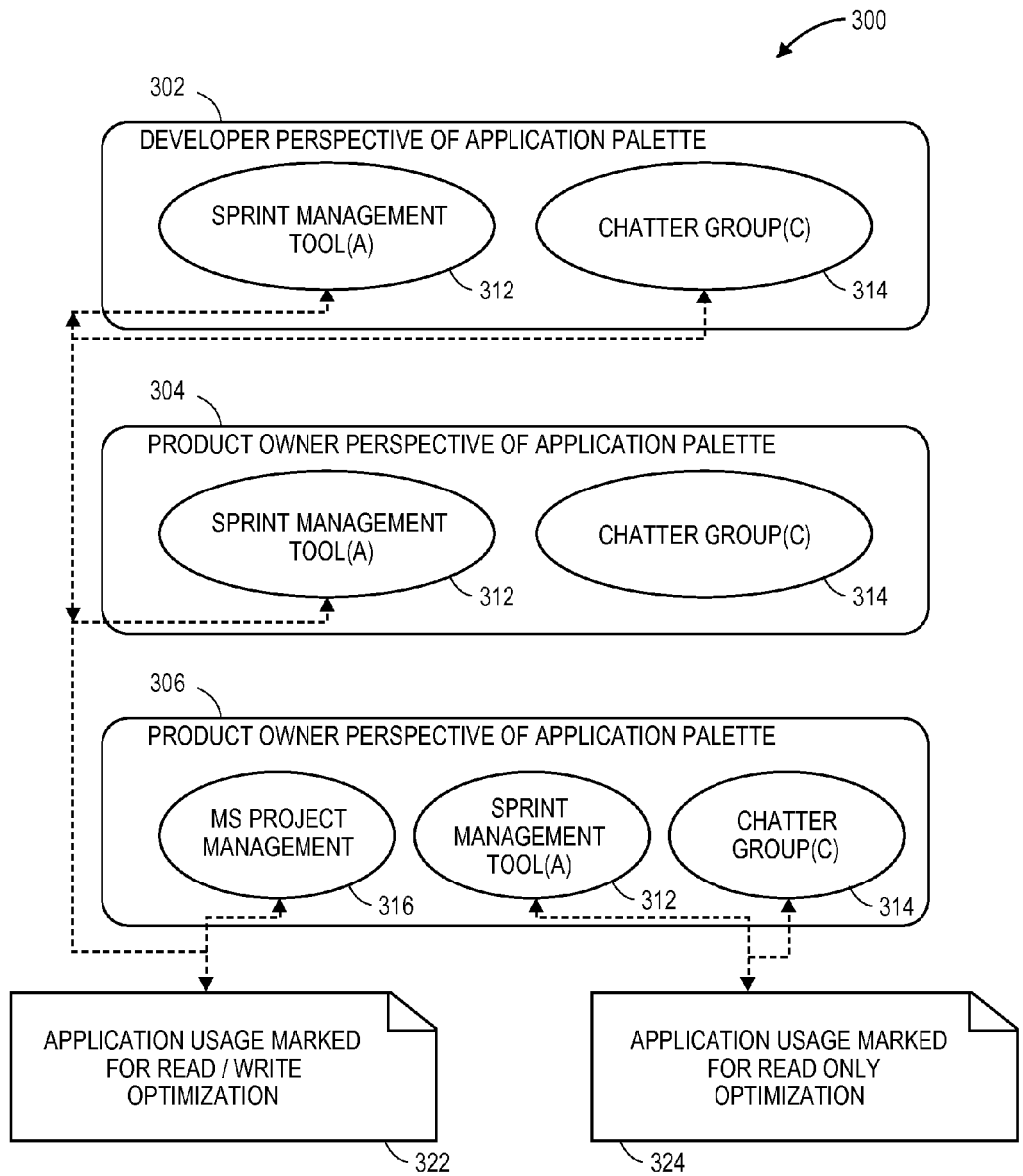
FIG. 3A illustrates a development tools presentation in the requirement phase of a software development cycle according to one embodiment.

FIG. 3A illustrates a development tools presentation 300 in the requirement phase of a software development cycle according to one embodiment. As illustrated, using model interference as facilitated by tools interaction mechanism 110 of FIG. 1, the requirement phase-based presentation 300 provides the model-inferred ordering, filtering, and usage customization of development tools 312-316 from various perspectives 302-306 through application palettes. For example, the software developer/programmer may see two icons, one each for Sprint management tool 312 and Chatter group 314 and in that order. Similarly, the product owner may see the same filtered perspective 304 having the same two development tools 312, 314, but the product manager's perspective 306 may be a bit different and include MS project management tool 316, Sprint management tool 312, and Chatter group 314. Regarding usage customization, in one embodiment, Sprint management tool 312 may be customized and marked as read/write 322 for the developer and the product owner, whereas it is customized and marked as read only 324 for the product manager.

Figure 3B:
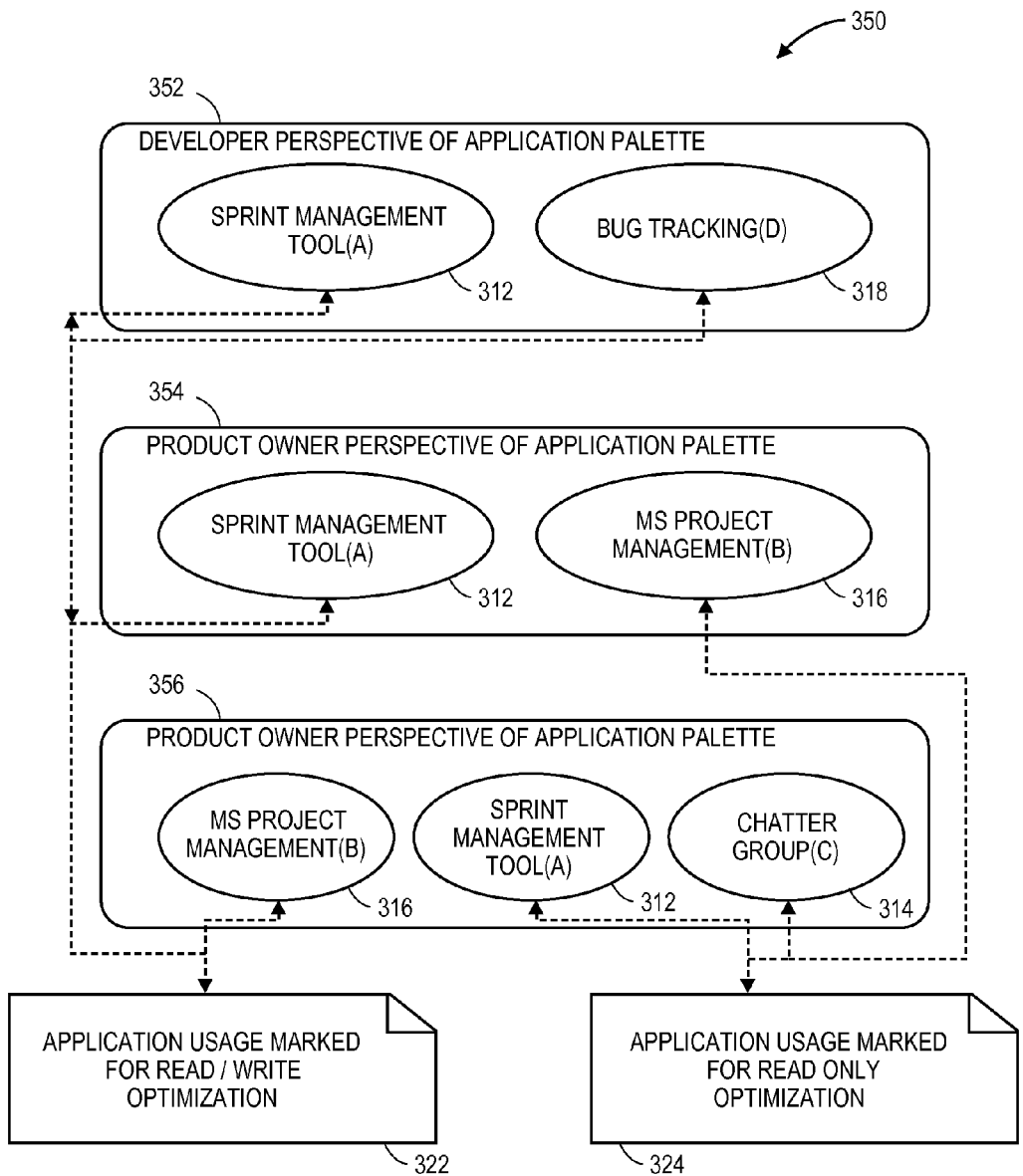
FIG. 3B illustrates a development tools presentation in the implementation phase of a software development cycle according to one embodiment.

FIG. 3B illustrates a development tools presentation 350 in the implementation phase of a software development cycle according to one embodiment. As illustrated, using model interference as facilitated by tools interaction mechanism 110 of FIG. 1, implementation phase-based presentation 350 provides the model-inferred ordering, filtering, and usage customization of development tools 312-318 various perspectives 352-356 through application palettes. For example, as shown in FIG. 3A, the software developer/programmer may be presented Sprint management tool 312 and Chatter group 314 in the requirement-based presentation 302, whereas, here in FIG. 3B, upon processing, using the model-inference technique of tools interaction mechanism 110 of FIG. 1, the implementation-based presentation 352 includes a filtered-version now including Sprint management tool 312 and bug tracking tool 318 (as opposed to Chatter group 314).

Similarly, the filtered implementation-based presentation 354 now includes Sprint management tool 312 MS project management tool 316 as opposed to Chatter group 314 from its counter-part requirement-based presentation 304. However, the filtered implementation-based presentation 356 for product manager includes the same development tools 316, 312, 314 and in the same order as in the requirement-based presentation 306. Further, for example, in this presentation 350, Sprint management tool 312 when presented to the product manager in presentation 356, it is regarded as read-only usage 324, whereas Sprint management tool 312 when presented to the developer and the product owner in presentations 352 and 352, respectively, may be regarded as read/write usage 322. Further, MS product management tool 316 is optimized for read/write 322, whereas Chatter group 314 is assigned read-only 324. It is contemplated that development tools 312-318, user positions (e.g., software developer, product owner, product manager, etc.), etc., are merely used as examples for the sake of brevity, clarity, and ease of understanding and that embodiments are not limited to such examples and/or implementation details.

Figure 4A:
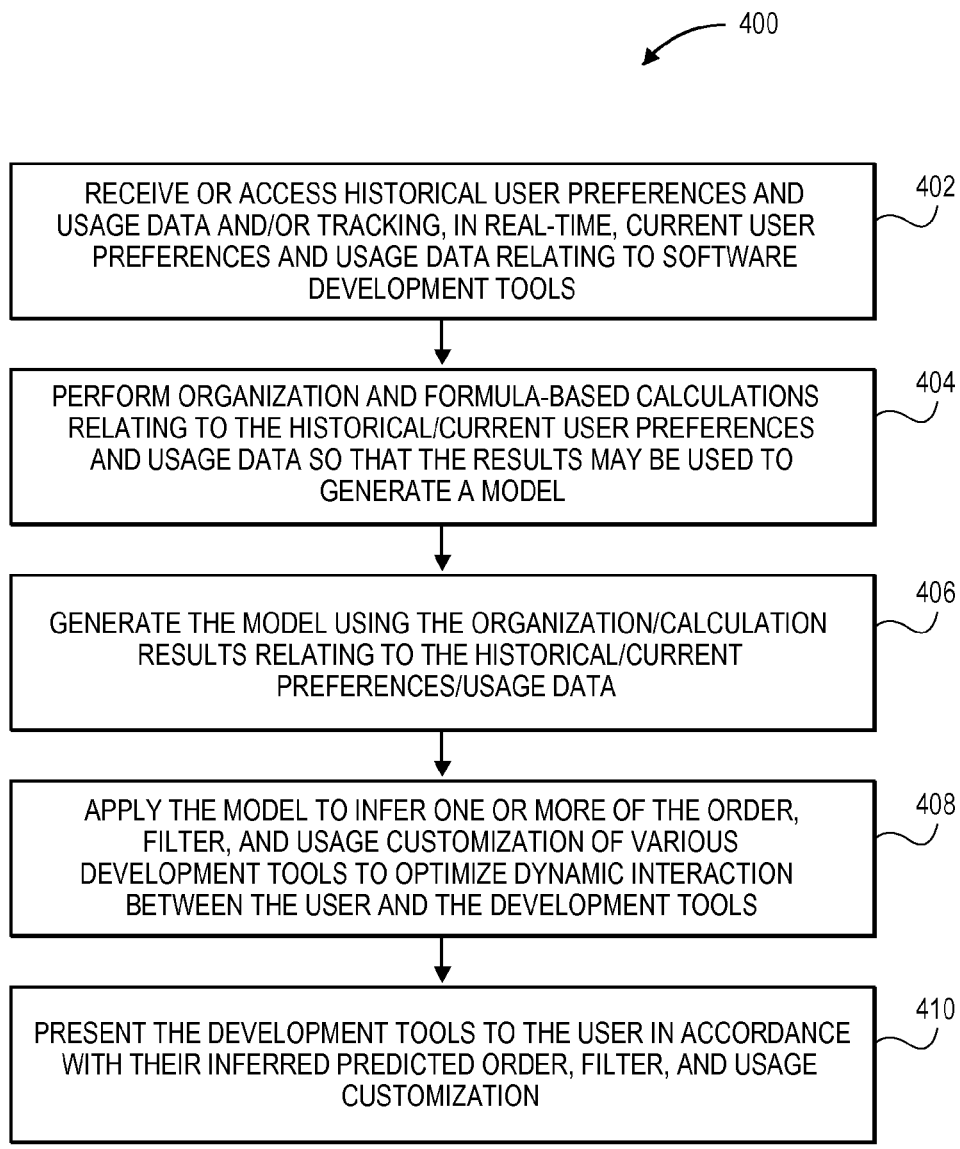
FIG. 4A illustrates a method for facilitating dynamic interaction with development applications and tools in an on-demand services environment in a multi-tenant environment according to one embodiment.

FIG. 4A illustrates a method 400 for facilitating dynamic interaction with development applications and tools in an on-demand services environment in a multi-tenant environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by dynamic development tools interaction mechanism 110 of FIG. 1.

Method 400 begins at block 402 with receiving or accessing historical user preferences and usage data and/or tracking, in real-time, current user preferences and usage data relating to software development tools. At block 404, organization and formulae-based calculations relating to the historical/current user preferences and usage data are performed so that the results may be used to generate a model which may then be used to infer from it, for example, the presentation order of various development tools as it relates to various users (e.g., developer, owner, manager, etc.) as well as the filtering and usage customization of those software development tools for each user. At block 406, using the organization/calculation results relating to the historical/current preferences/usage data, the model is generated. At block 408, the model is applied to help infer one or more of the order, filter, and usage customization of various development tools to optimize dynamic interaction between the user and the development tools.

At block 410, once the ordering, filtering, and usage customization of the development tools is performed, the developments tools are presented to the user in accordance with their inferred or predicted order, filter, and usage customization. It is contemplated that the user may have afforded a level of control to change or modify these results as desired or necessitated by the user and/or the user's organization and/or the available system resources, etc. In one embodiment, the presentation may include displaying various icons of the software development tools in accordance with their inferred order and filter, whereas the development tools may be customized for their usage according to the probability relating to each user as inferred and calculated using the model and tools interaction mechanism 110 of FIG. 1.

Figure 4B:
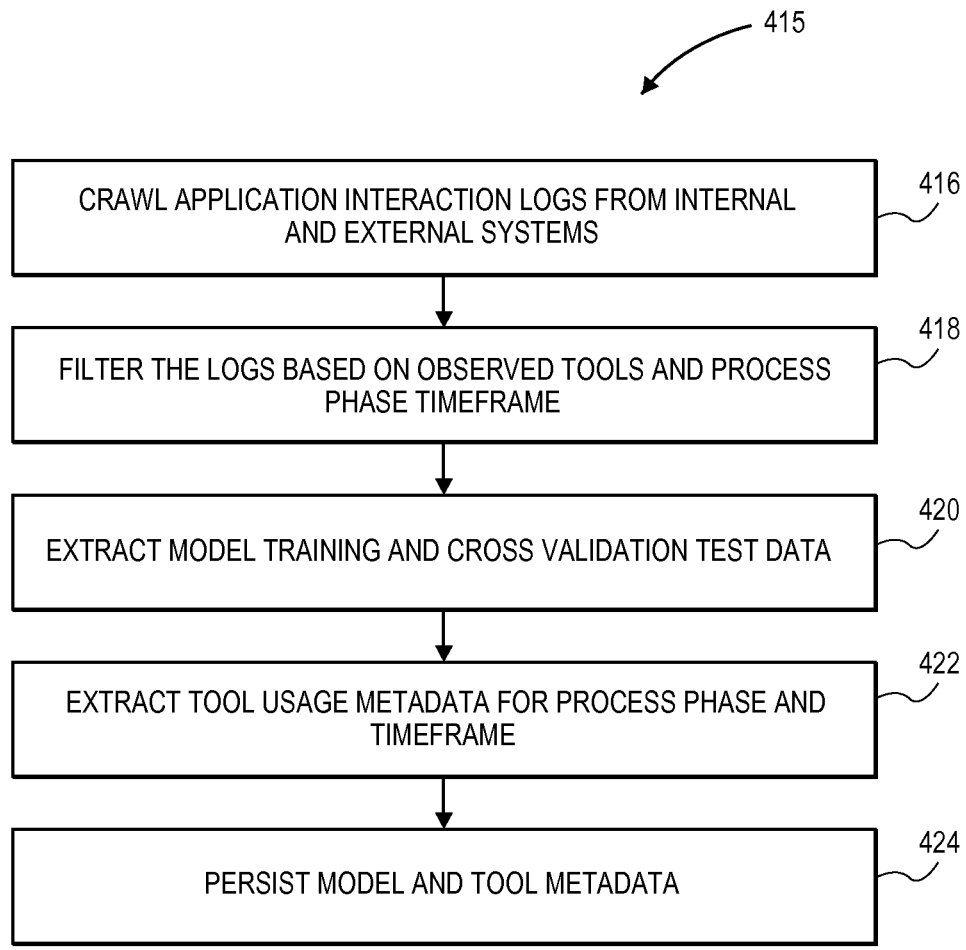
FIG. 4B illustrates a method for facilitating dynamic interaction with development applications and tools in an on-demand services environment in a multi-tenant environment according to one embodiment.

FIG. 4B illustrates a method 415 for facilitating dynamic interaction with development applications and tools in an on-demand services environment in a multi-tenant environment according to one embodiment. Method 415 may be performed by processing logic that may comprise hardware (e.g., circuitry, dedicated logic, programmable logic, etc.), software (such as instructions run on a processing device), or a combination thereof. In one embodiment, method 415 may be performed by dynamic development tools interaction mechanism 110 of FIG. 1.

Method 415 includes processes and details relating to application log processing for training and tool metadata as facilitated by tools interaction mechanism 110 of FIG. 1. Method 415 beings at block 416 where a crawl application, as facilitated by reception logic 202 of FIG. 2, interacts logs from various internal and external systems having log files. At block 418, the logs are filtered based on observed tools and a process phase timeframe (e.g., 3 months). At block 420, model training and cross-validation test data is extracted from the logs to generate a model (e.g., HMM). At block 422, tool usage metadata (e.g., user's historical/current preferences and usage data) is extracted for process phase and timeframe and, at block 424, the model and the tool metadata is generated and persisted.

Figure 4C:
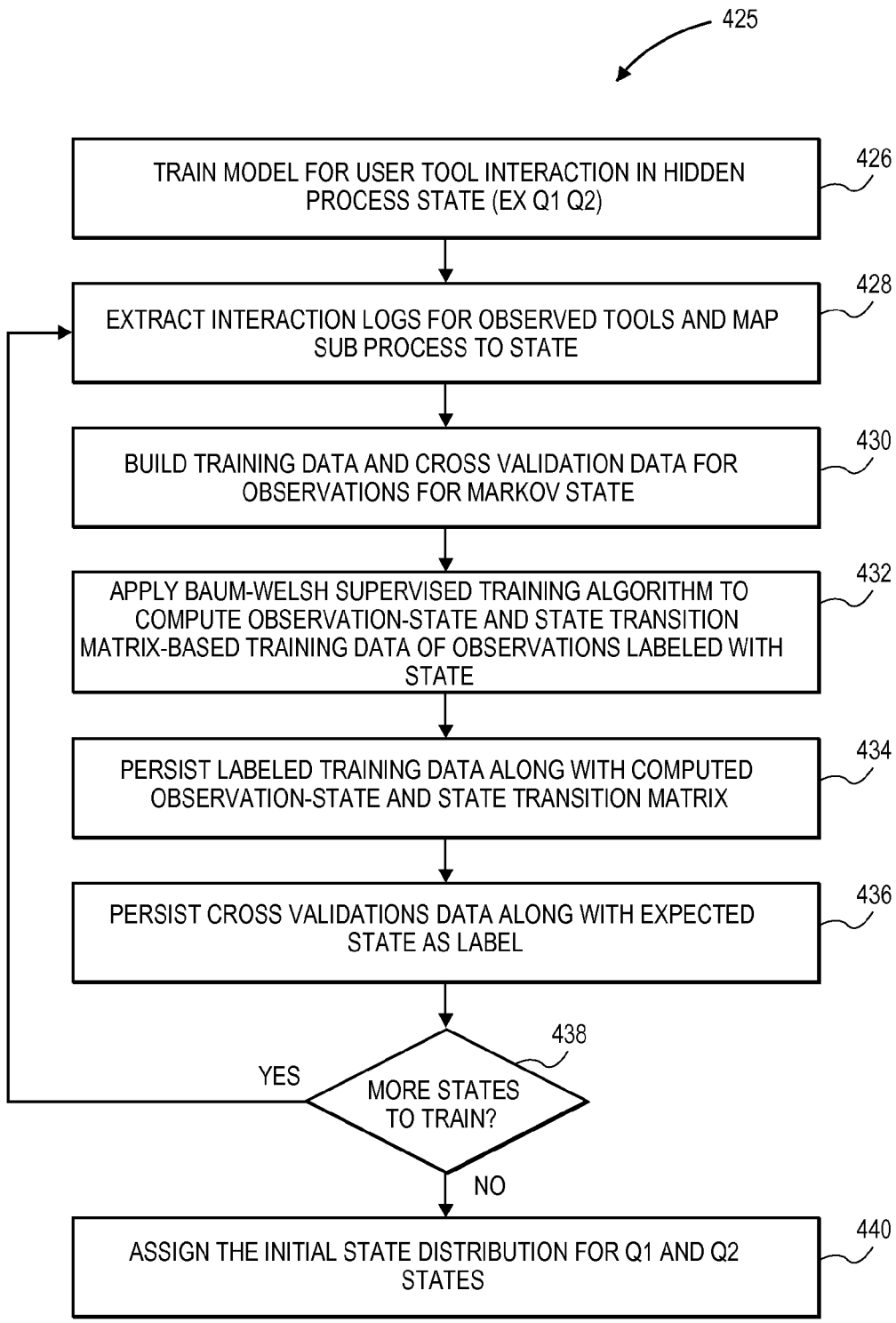
FIG. 4C illustrates a method for facilitating dynamic interaction with development applications and tools in an on-demand services environment in a multi-tenant environment according to one embodiment.

FIG. 4C illustrates a method 425 for facilitating dynamic interaction with development applications and tools in an on-demand services environment in a multi-tenant environment according to one embodiment. Method 425 may be performed by processing logic that may comprise hardware (e.g., circuitry, dedicated logic, programmable logic, etc.), software (such as instructions run on a processing device), or a combination thereof. In one embodiment, method 425 may be performed by dynamic development tools interaction mechanism 110 of FIG. 1.

Method 425 includes processes and details relating to model generation and training as facilitated by model generation and application logic 212 of tools mechanism 110 of FIG. 1. For the sake of brevity, clarity, and ease of understanding, we consider HMM as the model here and so method 425 beings at block 426 where a model (e.g., HMM) is trained for user tool interaction hidden process state (e.g., Q1, Q2, etc.). In other embodiments, other machine learning algorithms may be used. At block 428, the interaction logs are extracted for the observed tools to map sub-processes to state. At block 430, training data and cross-validation data are built for observations for Markov state. At block 432, the Baum-Welsh supervised training algorithm is applied to compute the observation state and state transition matrix based training data of observations labeled with state. At block 434, the label training data is persisted long with the computed observation state and state transition matrix and, at block 436, the cross validation data and is persisted along with the expected state as a label. At block 438, a determination is made as to whether there are any more states to train. If not, the process ends with the assignment of initial state distribution for Q1 and Q2 states at block 440. If yes, the process continues with processing block 428.

Figure 4D:
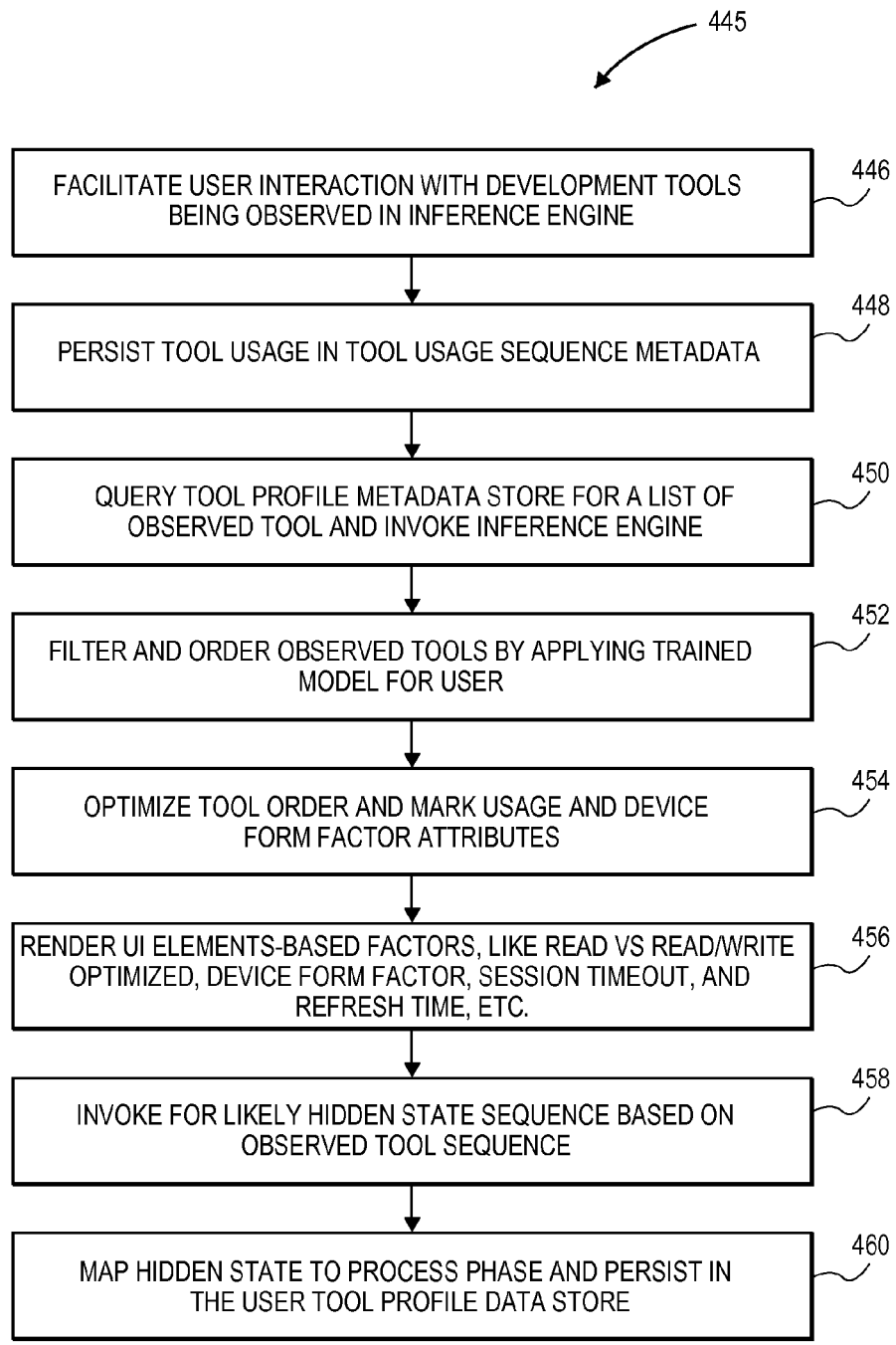
FIG. 4D illustrates a method for facilitating dynamic interaction with development applications and tools in an on-demand services environment in a multi-tenant environment according to one embodiment.

FIG. 4D illustrates a method 445 for facilitating dynamic interaction with development applications and tools in an on-demand services environment in a multi-tenant environment according to one embodiment. Method 445 may be performed by processing logic that may comprise hardware (e.g., circuitry, dedicated logic, programmable logic, etc.), software (such as instructions run on a processing device), or a combination thereof. In one embodiment, method 445 may be performed by dynamic development tools interaction mechanism 110 of FIG. 1.

Method 445 includes processes and details relating to runtime flow of model inference and UI rendering as facilitated by model generation and application logic 212 and presentation logic 224 of tools mechanism 110 of FIG. 1. Method 445 beings at block 446 with user interactions with one or more software development tools being observed by model applicator 216 or inference engine of model generation and application logic 212 of FIG. 2. At block 448, the tool usage is persisted in the tool usage sequence metadata and, at block 450, the presentation logic 224 or application palette UI engine queries the tool profile metadata store for a list of observed tools and invokes the inference engine as further described with reference to FIG. 4E. At block 452, the inference engine filters and orders observed tools by applying the trained model for users and, at block 454, the inference engine may facilitate the application palette UI engine to optimize the tool order and mark the usage and device to form factor attributes. At block 456, UI elements based factors, like read-optimized, read/write-optimized, etc., are rendered at computing device for the user to view while periodically, session timeouts and refresh times may be triggered to keep current the development tools list. At block 458, any likely hidden state sequence may be triggered, such as by the inference engine, based on an observed tool sequence as further described with reference to FIG. 4F. At block 460, the map hidden state is used to process phase and persist in user tool profile data store.

Figure 4E:
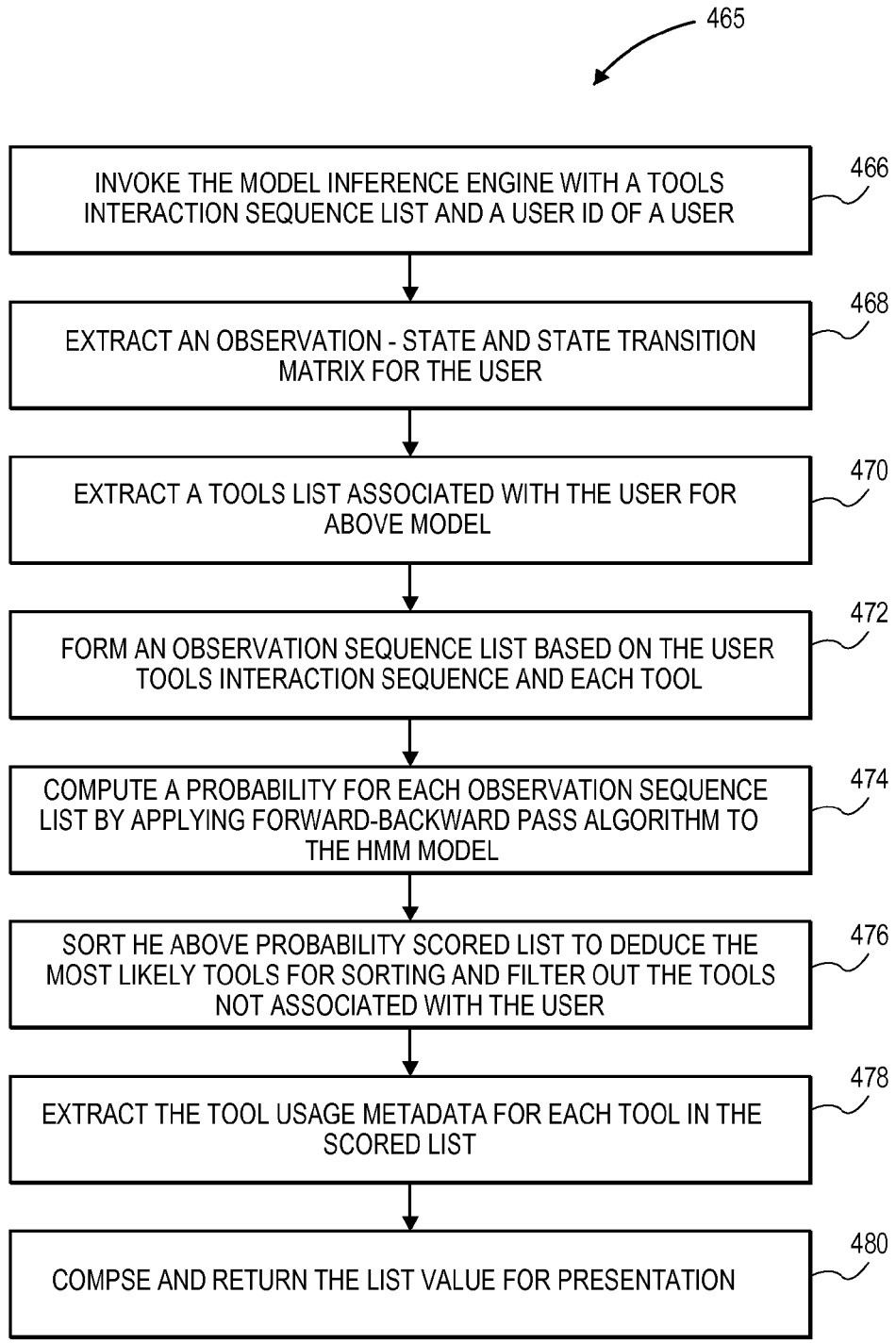
FIG. 4E illustrates a method for facilitating dynamic interaction with development applications and tools in an on-demand services environment in a multi-tenant environment according to one embodiment.

FIG. 4E illustrates a method 465 for facilitating dynamic interaction with development applications and tools in an on-demand services environment in a multi-tenant environment according to one embodiment. Method 465 may be performed by processing logic that may comprise hardware (e.g., circuitry, dedicated logic, programmable logic, etc.), software (such as instructions run on a processing device), or a combination thereof. In one embodiment, method 465 may be performed by dynamic development tools interaction mechanism 110 of FIG. 1.

Method 465 includes processes and details relating to model (e.g., HMM) training data flow as facilitated by model generation and application logic 212 and presentation logic 224 of tools mechanism 110 of FIG. 1. Method 465 beings at block 466 with an invocation of the inference engine with a tools interaction sequence list and user ID. At block 468, the observation state and state transition matrix is extracted for a user from a data store. At block 470, a tool list associated with the user is extracted for the model. At block 472, an observation sequence list is formed based on the user tools interaction sequence and each tool. At block 474, a probability for each observation sequence list is computed by applying the forward-backward algorithm to the model. The forward-backward algorithm may serve as an inference algorithm for Hidden Markov Models to infer and computes posterior marginal of hidden state variables given a sequence of observations/emissions. As aforementioned, HMM is merely used as an example in this document and that embodiments are not limited to HMM and that other models may be generated and applied. Similarly, embodiments are not limited to the aforementioned forward-backward algorithm and that other algorithms, depending on the model being generated and used, may be employed. At block 476, the computed probability is then sorted into a scored list to deduce the most likely used tool for sorting and filtering tools not associated with the user. At block 478, the tool usage metadata is extracted for each tool in the scored list. At block 480, a list value is composed and returned to the application palette UI engine or presentation logic 224 of FIG. 2.

Figure 4F:
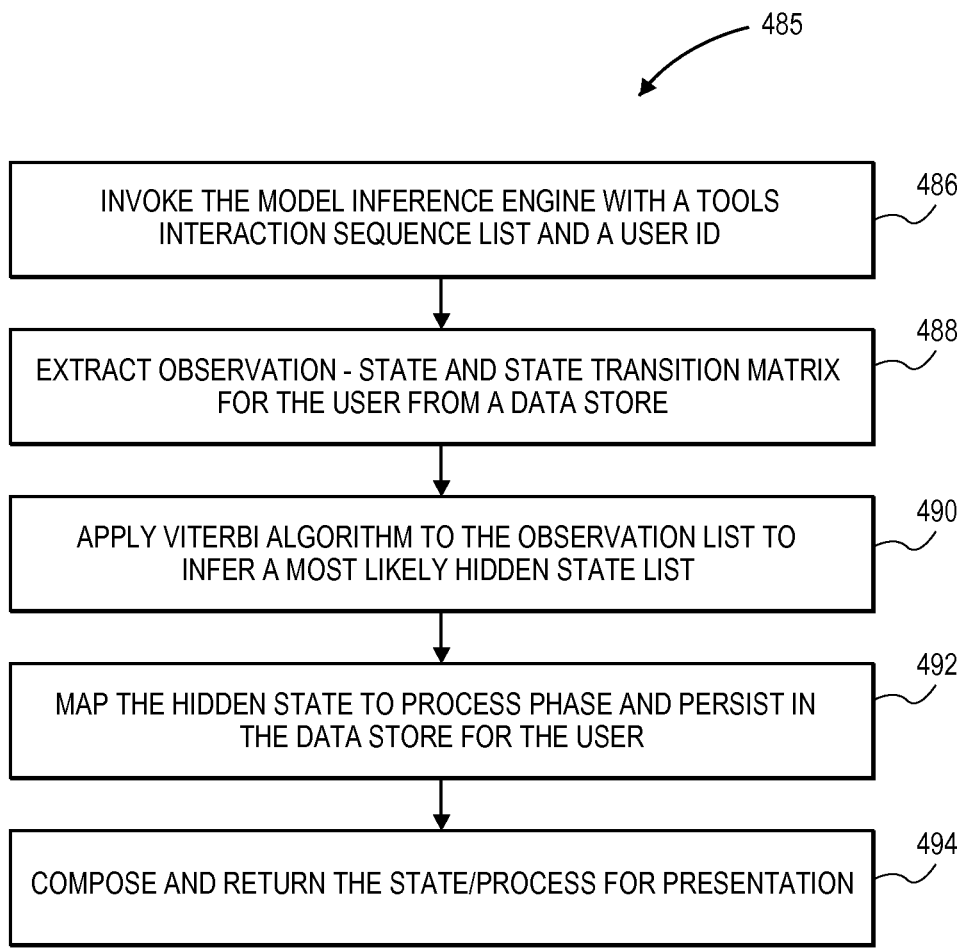
FIG. 4F illustrates a method for facilitating dynamic interaction with development applications and tools in an on-demand services environment in a multi-tenant environment according to one embodiment.

FIG. 4F illustrates a method 485 for facilitating dynamic interaction with development applications and tools in an on-demand services environment in a multi-tenant environment according to one embodiment. Method 485 may be performed by processing logic that may comprise hardware (e.g., circuitry, dedicated logic, programmable logic, etc.), software (such as instructions run on a processing device), or a combination thereof. In one embodiment, method 485 may be performed by dynamic development tools interaction mechanism 110 of FIG. 1.

Method 485 includes processes and details relating to estimating a hidden process state from a model (e.g., HMM) inference flow as facilitated by model generation and application logic 212 and presentation logic 224 of tools mechanism 110 of FIG. 1. Method 485 beings at block 486 with an invocation of the inference engine using a tools interaction sequence and user ID. At block 488, the observation state and state transition matrix are extracted for a user from a data store. At block 490, the Viterbi algorithm is applied to the observation list to infer a most likely hidden state list. At block 492, the hidden state is mapped to process a phase and to persist in the data store for the user. Further, the HMM-inferred hidden state may be used for customizing and/or presenting UI elements in tools and interfaces. This may be based on a business process, which maps either statically or dynamically to the hidden state and in turn presents themes and alters aesthetics of the interaction. Further, end user experiences may be enhanced or altered based on these inferred processes, such as the user have a customized view of various development applications and tools as, for example, described with reference to FIGS. 3A and 3B. At block 494, a state/process is composed and returned to the application palette UI engine.

Figure 5:
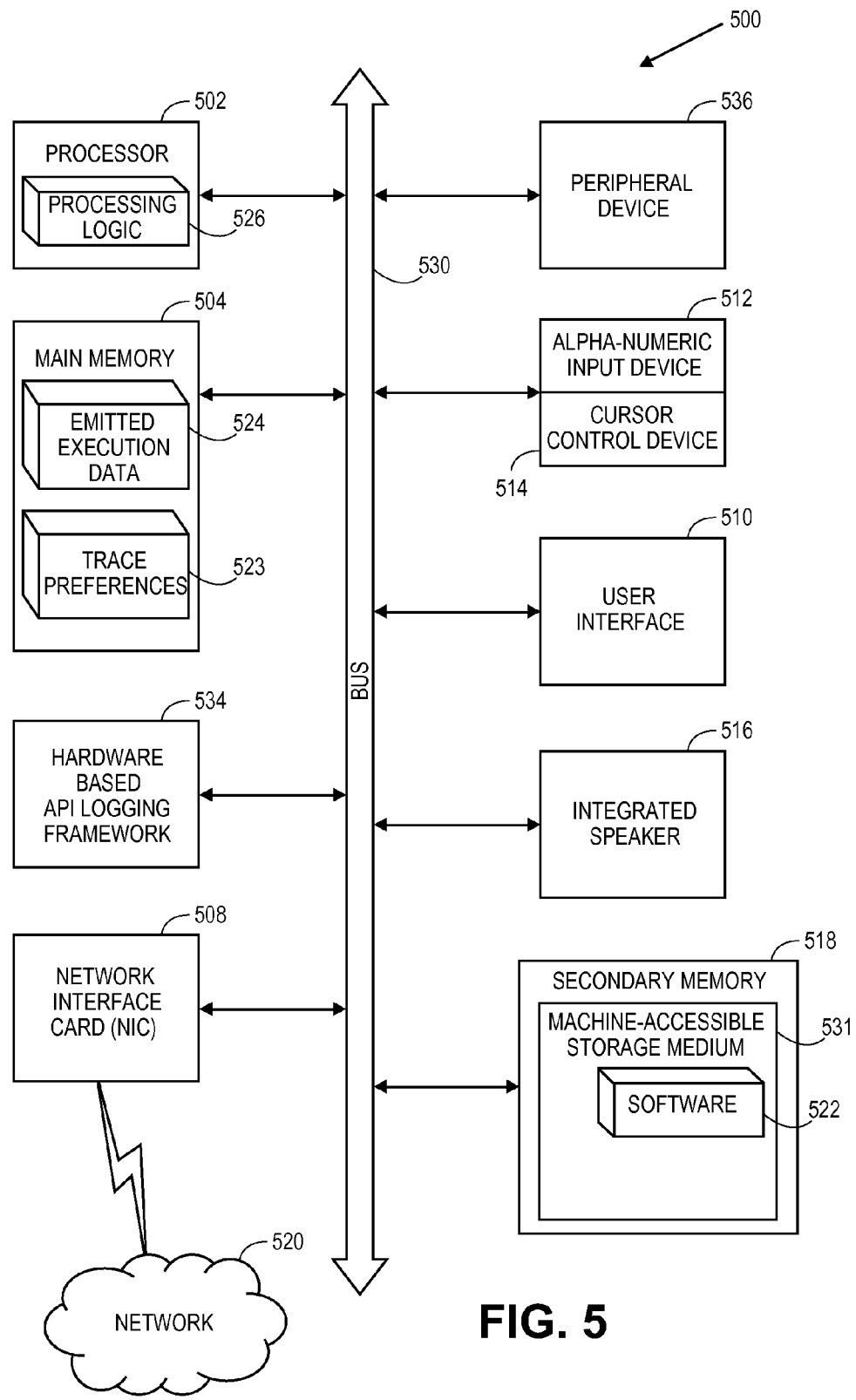
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 220 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
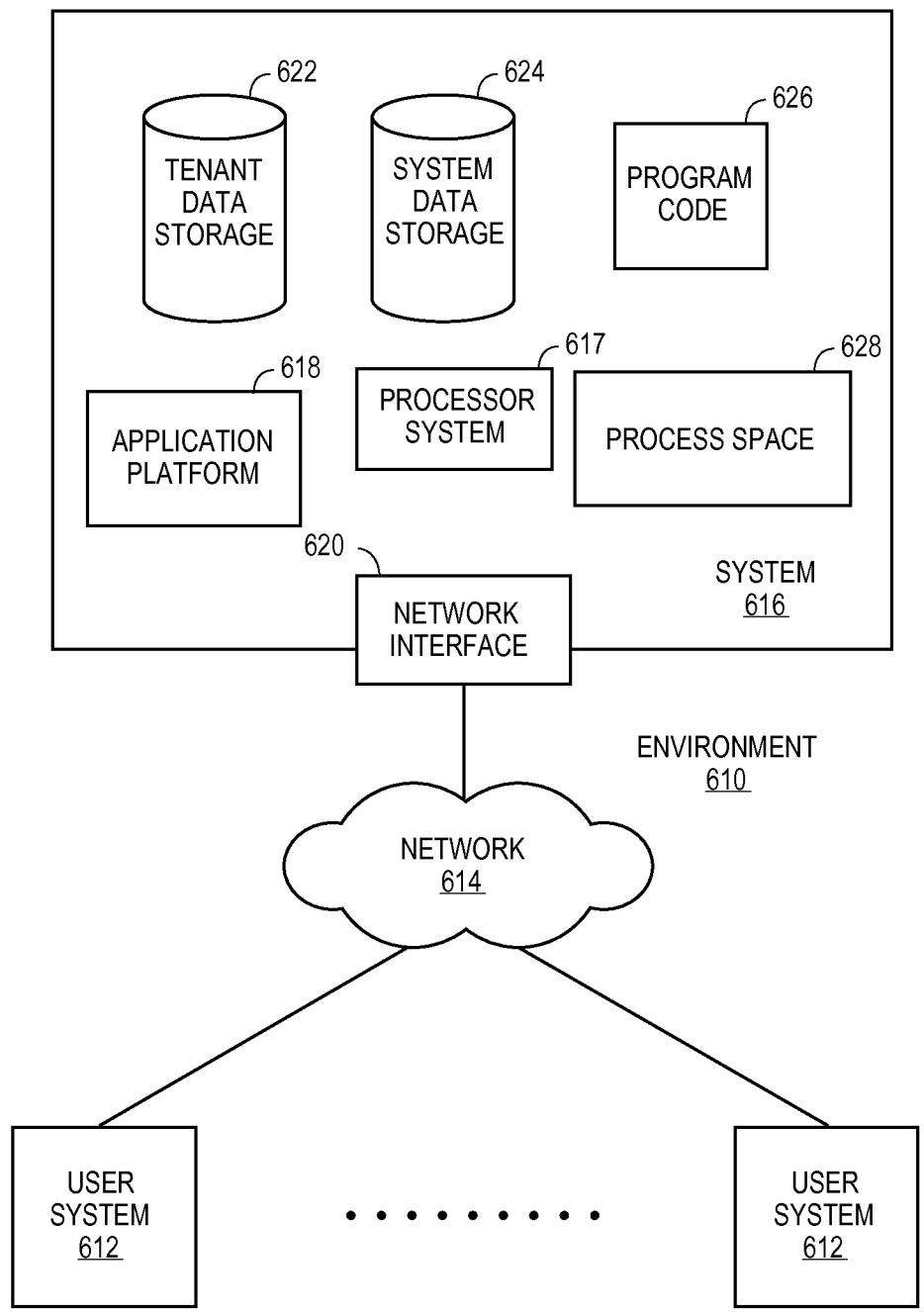
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
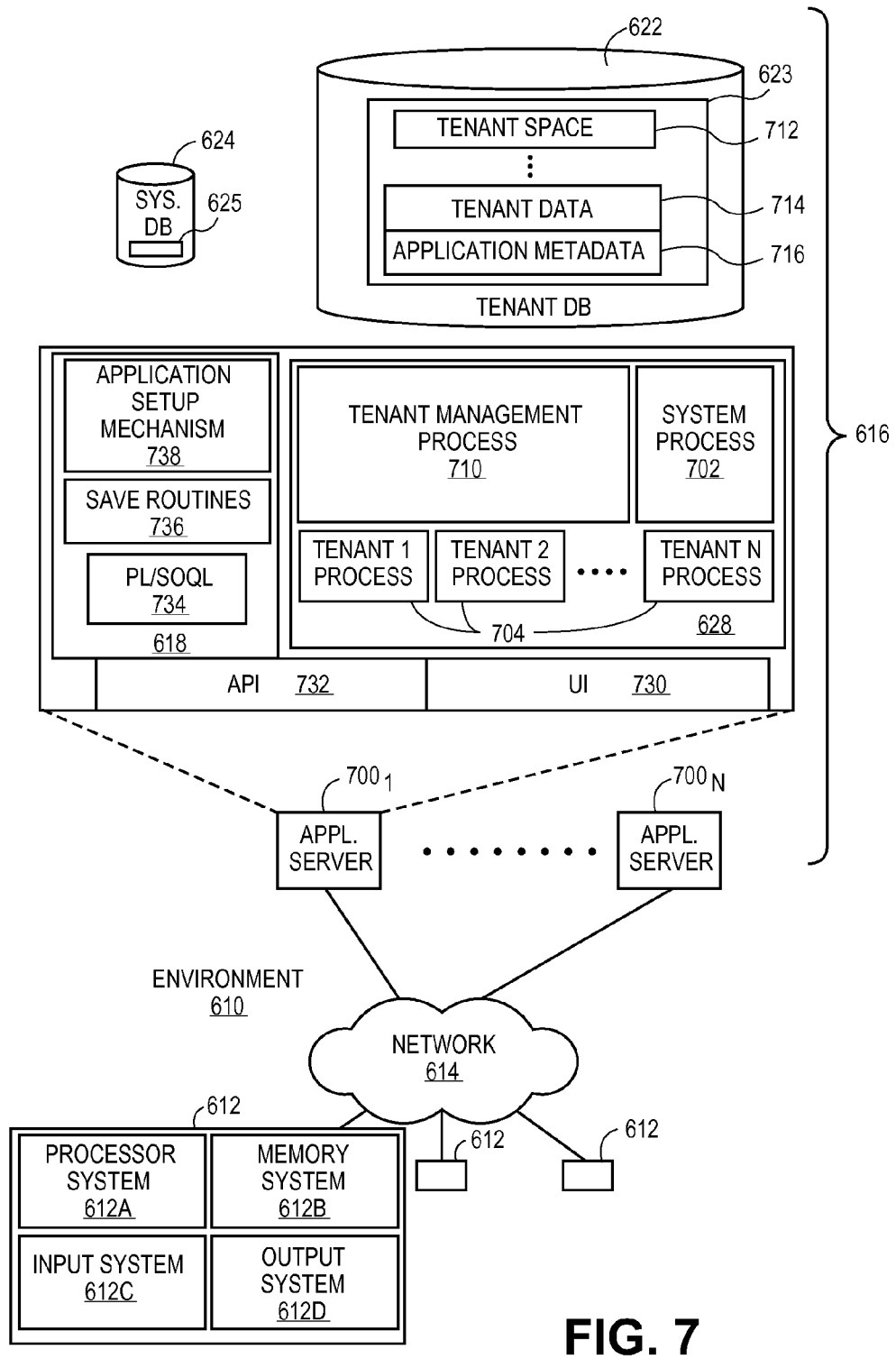
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:

receiving, from log files, historical user preferences and usage data relating to a user and one or more development tools for software development at a computing device, wherein the historical user preferences and usage data are based on past acts of the user and recorded at the log files;

generating a model based on the historical user preferences and usage data, wherein the usage data comprises real-time user activities including read activity or write activity relating to one or more features of the one or more development tools, and wherein the historical user preferences are based on historical real-time tracking of the real-time user activities over a period of time;

determining, via a processor, one or more predictions from the model, wherein the predictions include one or more of: an ordering of the development tools, a filtering of a plurality of features of one or more of the development tools, and a usage-based customization of the one or more development tools; and providing the development tools for display to the user based on the predictions.

2. The method of claim 1, wherein providing the development tools for display includes displaying the development tools according to one or more of the ordering, filtering, and usage-based customization, wherein the development tools are displayed, via a display device, at the computing device, wherein the one or more predictions comprise predictive estimations about the user's predictive interaction with the one or more of the development tools.

3. The method of claim 2, wherein the ordering comprises arranging icons relating to the development tools in a particular order on a screen of the display device as determined from the one or more predictions.

4. The method of claim 2, wherein the filtering comprises one or more of adding, removing, and modifying one or more features of each of the development tools based on the one or more predictions.

5. The method of claim 2, wherein the usage-based customizations comprise facilitating real-time modification of one or more of the development tools based on the one or more predictions.

6. The method of claim 5, wherein facilitating real-time modification comprises dynamically performing, in real-time and based on the current preferences, one or more of: configuring the one or more development tools according to the user's current usage, adding new features to the one or more development tools, removing or modifying existing features of the one or more development tools, adding one or more new tools to the development tools, and removing one or more development tools from the development tools.

7. A system comprising:

a computing device having a memory to store instructions, and a processing device to execute the instructions, the computing device further having a mechanism to:

receive, from log files, historical user preferences and usage data relating to a user and one or more development tools for software development at a computing device, wherein the historical user preferences and usage data are based on past acts of the user and recorded at the log files;

generate a model based on the historical user preferences and usage data, wherein the usage data comprises real-time user activities including read activity or write activity relating to one or more features of the one or more development tools, and wherein the historical user preferences are based on historical real-time tracking of the real-time user activities over a period of time;

determine one or more predictions from the model, wherein the predictions include one or more of: an ordering of the development tools, a filtering of a plurality of features of one or more of the development tools, and a usage-based customization of the one or more development tools; and provide the development tools for display to the user based on the predictions.

8. The system of claim 7, wherein when providing the development tools for display, the mechanism is further to display the development tools according to one or more of the ordering, filtering, and usage-based customization, wherein the development tools are displayed, via a display device, at the computing device, wherein the one or more predictions comprise predictive estimations about the user's predictive interaction with the one or more of the development tools.

9. The system of claim 8, wherein the ordering comprises arranging icons relating to the development tools in a particular order on a screen of the display device as determined from the one or more predictions.

10. The system of claim 8, wherein the filtering comprises one or more of adding, removing, and modifying one or more features of each of the development tools based on the one or more predictions.

11. The system of claim 8, wherein the usage-based customizations comprise facilitating real-time modification of one or more of the development tools based on the one or more predictions.

12. The system of claim 11, wherein when facilitating real-time modification, the mechanism is further to dynamically perform, in real-time and based on the current preferences, one or more of: configuring the one or more development tools according to the user's current usage, adding new features to the one or more development tools, removing or modifying existing features of the one or more development tools, adding one or more new tools to the development tools, and removing one or more development tools from the development tools.

13. A non-transitory machine-readable medium having stored thereon instructions which, when executed by a processor, cause the processor to:

receive, from log files, historical user preferences and usage data relating to a user and one or more development tools for software development at a computing device, wherein the historical user preferences and usage data are based on past acts of the user and recorded at the log files;

generate a model based on the historical user preferences and usage data, wherein the usage data comprises real-time user activities including read activity or write activity relating to one or more features of the one or more development tools, and wherein the historical user preferences are based on historical real-time tracking of the real-time user activities over a period of time;

determine one or more predictions from the model, wherein the predictions include one or more of: an ordering of the development tools, a filtering of a plurality of features of one or more of the development tools, and a usage-based customization of the one or more development tools; and provide the development tools for display to the user based on the predictions.

14. The non-transitory machine-readable medium of claim 13, wherein when providing the development tools for display, the processor is further to display the development tools according to one or more of the ordering, filtering, and usage-based customization, wherein the development tools are displayed, via a display device, at the computing device, wherein the one or more predictions comprise predictive estimations about the user's predictive interaction with the one or more of the development tools.

15. The non-transitory machine-readable medium of claim 14, wherein the ordering comprises arranging icons relating to the development tools in a particular order on a screen of the display device as determined from the one or more predictions.

16. The non-transitory machine-readable medium of claim 14, wherein the filtering comprises one or more of adding, removing, and modifying one or more features of each of the development tools based on the one or more predictions, and wherein the usage-based customizations comprise facilitating real-time modification of one or more of the development tools based on the one or more predictions.

17. The non-transitory machine-readable medium of claim 16, wherein when facilitating real-time modification, the processor is further to dynamically perform, in real-time and based on the current preferences, one or more of: configuring the one or more development tools according to the user's current usage, adding new features to the one or more development tools, removing or modifying existing features of the one or more development tools, adding one or more new tools to the development tools, and removing one or more development tools from the development tools.

* * * * *